(12) United States Patent
Spradling

(10) Patent No.: US 11,291,192 B2
(45) Date of Patent: Apr. 5, 2022

(54) MODULAR BEEHIVE APPARATUS

(71) Applicant: Victor Spradling, Albuquerque, NM (US)

(72) Inventor: Victor Spradling, Albuquerque, NM (US)

(73) Assignee: Uncle A's Beehive LLC, Albuquerque, NM (US)

( * ) Notice: Subject to any disclaimer, the term of this patent is extended or adjusted under 35 U.S.C. 154(b) by 0 days.

(21) Appl. No.: 16/735,640

(22) Filed: Jan. 6, 2020

(65) Prior Publication Data

US 2021/0037795 A1    Feb. 11, 2021

Related U.S. Application Data

(63) Continuation of application No. 16/424,032, filed on May 28, 2019, now abandoned.

(51) Int. Cl.
*A01K 47/06* (2006.01)
*A01K 47/02* (2006.01)

(52) U.S. Cl.
CPC .............. *A01K 47/02* (2013.01); *A01K 47/06* (2013.01)

(58) Field of Classification Search
CPC ........ A01K 47/00; A01K 47/02; A01K 47/04; A01K 47/06
USPC .................... 449/3, 6, 13, 15, 20, 32, 35, 42
See application file for complete search history.

(56) References Cited

U.S. PATENT DOCUMENTS

| | | | | | |
|---|---|---|---|---|---|
| 138,661 | A | * | 5/1873 | Kretchmer | A01K 47/00 449/41 |
| 196,060 | A | * | 10/1877 | Train | A01K 47/00 449/34 |
| 346,883 | A | * | 8/1886 | Armstrong | A01K 47/06 449/20 |
| 1,144,878 | A | * | 6/1915 | Tenyak | A01K 47/00 449/6 |
| 1,211,587 | A | * | 1/1917 | Jordan | A01K 47/00 449/7 |

(Continued)

FOREIGN PATENT DOCUMENTS

| | | | | |
|---|---|---|---|---|
| CN | 105850783 A | * | 8/2016 | |
| DE | 405693 C | * | 11/1924 | A01K 47/02 |

(Continued)

OTHER PUBLICATIONS

English-language translation of FR 3042384 (Year: 2017).*

*Primary Examiner* — Lisa L Tsang
(74) *Attorney, Agent, or Firm* — Fitzsimmons IP Law

(57) ABSTRACT

An improved modular beehive apparatus includes a hive body, a hive top, a hive bottom, a plurality of frames, and at least one securing means for securing at least the top to the body. In one embodiment of the present invention, the body is modular, thereby allowing multiple bodies to be stacked on top of one another. To ensure modularity, not only should an uppermost portion of the body be configured to mate with the top, but it should also be configured to mate with a lowermost portion of another body. To enhance integrity, the portions that mate (e.g., the top and body) should be "interlockable." The more interlocking the structures are, the more secure the beehive apparatus becomes. Especially if the structures are secured together (e.g., using screws, etc.).

20 Claims, 14 Drawing Sheets

(56) References Cited

U.S. PATENT DOCUMENTS

| | | | | |
|---|---|---|---|---|
| 1,242,628 A | * | 10/1917 | Woodman | A01K 47/00 449/30 |
| 1,752,710 A | * | 4/1930 | Swanson | B65D 45/08 292/300 |
| 4,094,026 A | * | 6/1978 | Simoni | A01K 47/00 449/21 |
| 5,035,668 A | * | 7/1991 | Ungar | A01K 47/00 449/6 |
| 5,628,671 A | * | 5/1997 | Stevens | A01K 67/033 449/14 |
| 2015/0272087 A1 | * | 10/2015 | Hopkins, Jr. | A01K 47/06 449/13 |
| 2017/0208779 A1 | * | 7/2017 | Rubright | A01K 47/02 |

FOREIGN PATENT DOCUMENTS

| | | | | |
|---|---|---|---|---|
| DE | 816323 C | * | 10/1951 | A01K 47/06 |
| DE | 2040242 A1 | * | 2/1972 | A01K 47/00 |
| DE | 3447535 A1 | * | 7/1986 | A01K 51/00 |
| DE | 3820478 A1 | * | 12/1989 | A01K 47/06 |
| FR | 3042384 A1 | * | 4/2017 | A01K 47/06 |
| KR | 100376798 B1 | * | 3/2003 | |
| KR | 200378380 Y1 | * | 3/2005 | |
| KR | 200435155 Y1 | * | 1/2007 | |
| KR | 20140007165 A | * | 1/2014 | |
| KR | 20180062935 A | * | 6/2018 | |

\* cited by examiner

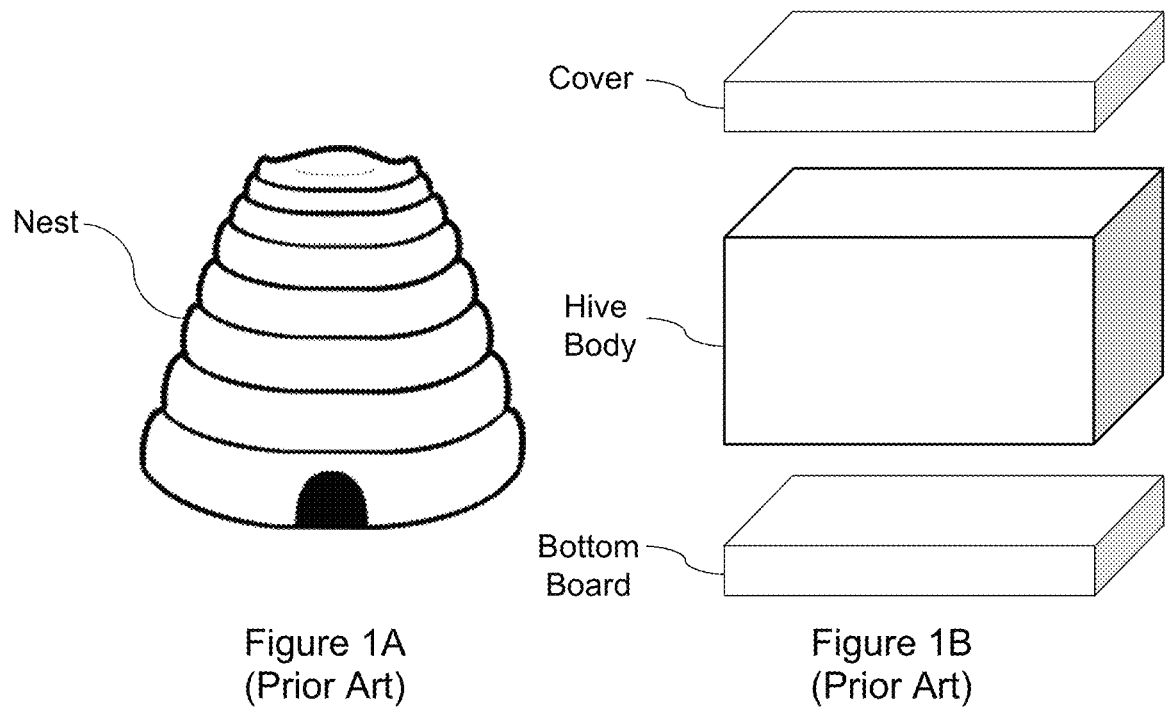
Figure 1A
(Prior Art)
Figure 1B
(Prior Art)
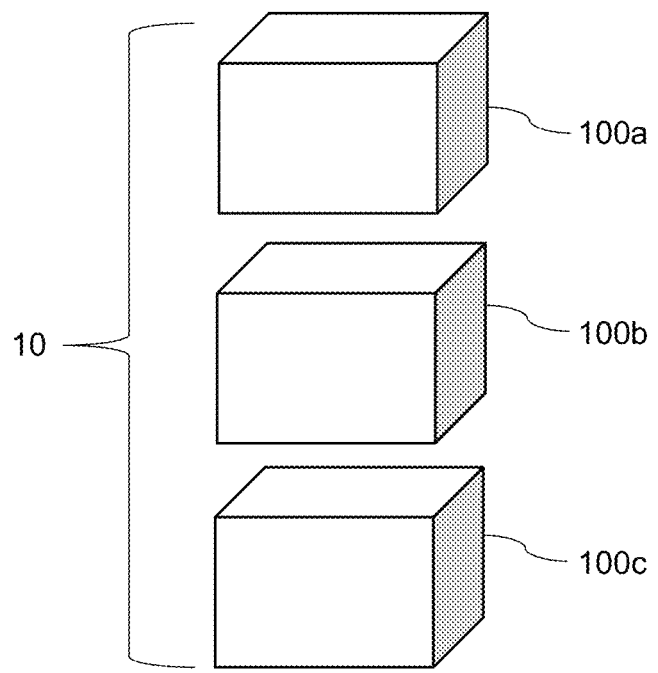
Figure 2

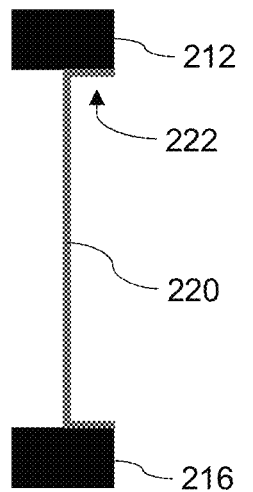
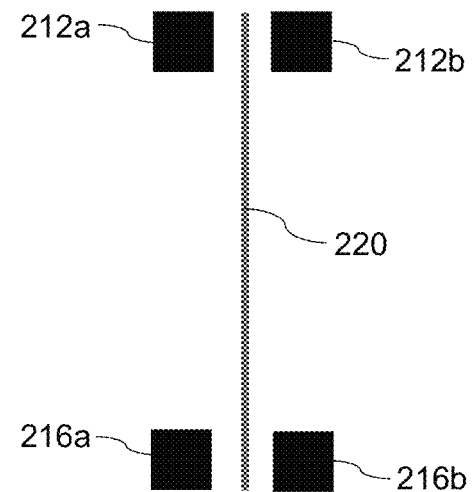
Figure 5A          Figure 5B
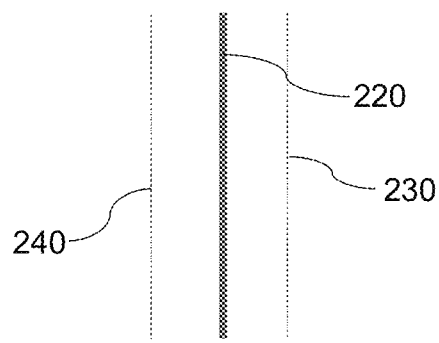
Figure 6

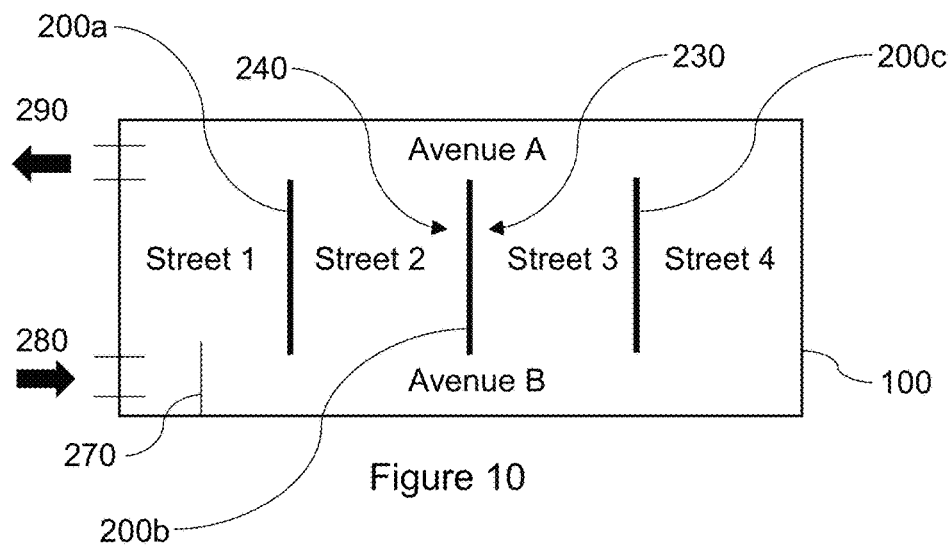
Figure 10
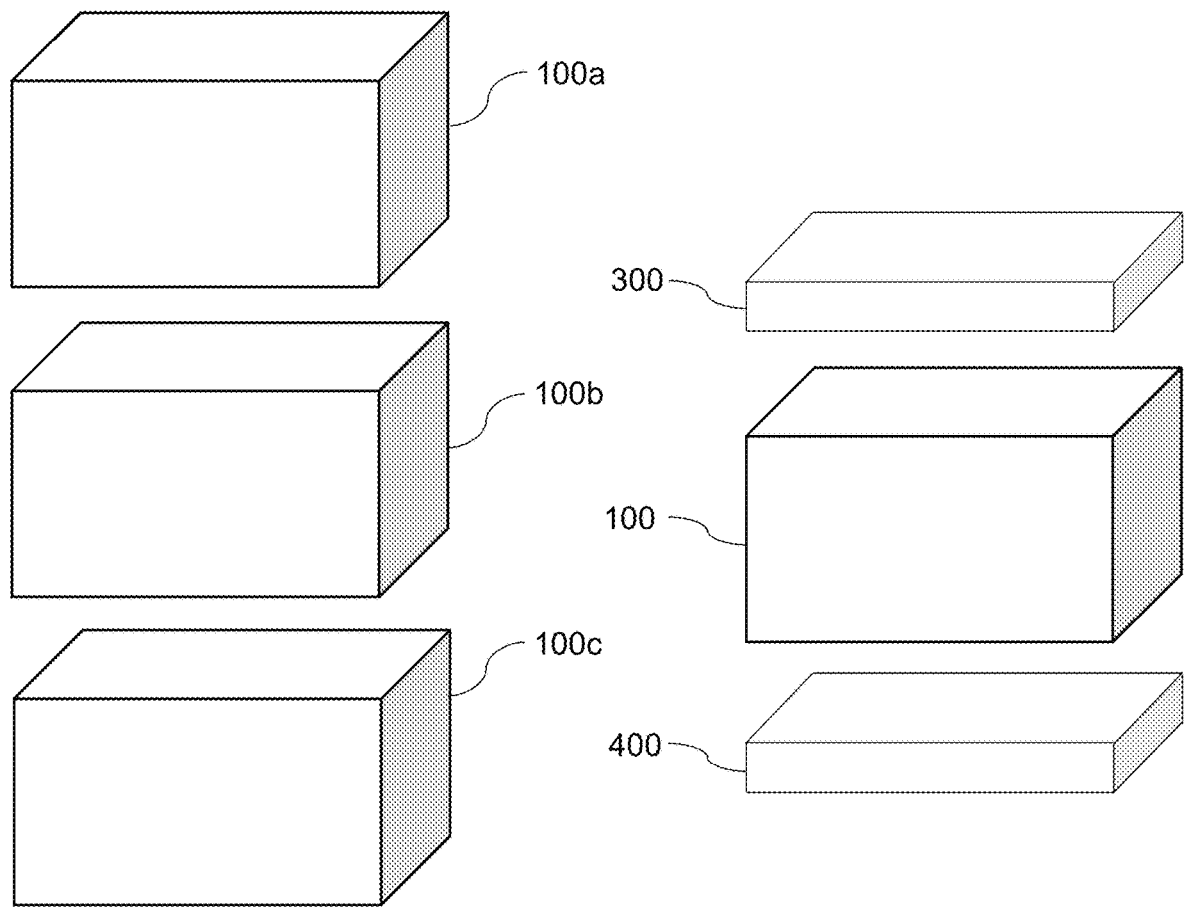
Figure 11A
Figure 11B

MODULAR BEEHIVE APPARATUS

BACKGROUND OF THE INVENTION

1. Field of the Invention

The present invention relates to beehives, and more particularly to a beehive apparatus, including the construction thereof, that is modular (e.g., allows multiple beehive bodies to be stacked on top of one another, etc.), accessible (e.g., allows access to an interior of the beehive to remove/replace frames, etc.), and resilient (e.g., allowing the apparatus to withstand harsh environmental conditions, such as weather, animals, etc.).

2. Description of Related Art

Beehives, which are man-made, artificial housing for bees, date back thousands of years (e.g., as early as 2422 BC). As with traditional nests (see, e.g., FIG. 1A), beehives provide housing for bees (e.g., honey bees, etc.), allowing them to build a complexed inner structure known as honey combs. A honey comb is a plurality of hexagonal prismatic cells that are constructed using bees wax and are for storing food (e.g., honey, pollen) and housing eggs, larvae, and pupae (i.e., the brood). While beehives serve several purposes (e.g., pollination of nearby crops, housing supply bees for apitherapy treatment, mitigating the effects of colony collapse disorder, etc.), they are primarily used in the production and harvesting of honey.

As shown in FIG. 1B, a beehive traditionally includes a hive body, a bottom board, a cover, and a plurality of frames (not shown), where the frames are positioned inside the hive body. Once the honey bees are introduced to the beehive (along with a queen, food, etc.), they will build honey combs on the frames (or foundational portions thereof). After a period of time, the frames can be removed, and the honey harvested therefrom. The frames (or new frames) can then be placed back into the hive body, allowing the process to repeat.

A key component to a beehive is easy access for the beekeeper (also known as a honey farmer or apiarist). Easy access allows the beekeeper to check status (e.g., honey comb status), remove frames (e.g., to harvest honey), and insert frames (e.g., during the start of a new production cycle) as necessary. Thus, the cover is usually placed (loosely) over the hive body, similar to a lid on a cardboard box. And if additional hive bodies are needed, they are merely stacked (again, loosely) on top of one another, with a cover on the upper-most hive body.

While this provides the beekeeper with easy access, there are several disadvantages to traditional beehives. For example, the antithesis of easy access is security. In other words, the easier a beehive is to access, the less secure it becomes. For example, by merely stacking components on one another, there is nothing that prevents the components from coming apart during, for example, sever weather conditions (e.g., wind, etc.), interference by wild animals (e.g., a bear, etc.), etc. For example, one good swipe by a bear and a traditional beehive will generally fall apart.

Thus, it would be advantageous to develop a system and method for housing bees (i.e., a beehive) that is both secure and relatively easy to access. It would further be advantageous to make the housing modular, allowing additional bodies (i.e., more than one hive body) to be placed between the lowermost and uppermost structures (e.g., the hive bottom and top). To this end, it would also be advantageous if a bottom of a hive body was configured to mate with a top of the hive body. This would allow the bottom of the hive body to mate with either a top of another hive body or a hive bottom. Similarly, it would allow the top of the hive body to mate with either a bottom of another hive body or a hive top.

SUMMARY OF THE INVENTION

The present invention provides a modular beehive apparatus. Preferred embodiments of the present invention include a hive body, a hive top, a hive bottom, and a plurality of frames, collectively assembled to form a beehive assembly. In one embodiment of the present invention, the hive body is configured to house the plurality of frames, where each frame is configured to be removed from (and inserted into) the body. The frames should be spaced apart, which may be accomplished via a plurality of channels (or groove) in the body, a plurality of indents (or recesses) on a ledge, or a plurality of spacers that are located between individual, adjacent frames.

Each frame may be a single unitary design, or may be segmented, e.g., include a top frame, a bottom frame, a left frame, and a right frame. The segments may be secured together so that the left and right frames are parallel to one another, the top and bottom frames are parallel to one another, and the left and right frames are perpendicular to the top and bottom frames. The frame may also include a foundation, which is a base structure on which a honey comb can be built. The foundation may comprise one or more materials, including metal (e.g., mesh, etc.), wax (e.g., beeswax, etc.), and/or plastic. The frames should be secured within the body so that the bees can access both sides of individual frames and travel from frame to frame. This may be accomplished by providing sufficient space between each frame, between end frames and sides of the body, between each frame and a hive top (or an uppermost portion of the hive body), and between each frame and a hive bottom (or a lowermost portion of the hive body). By providing space above and below, not only can the bees travel from frame to frame, but if multiple bodies are stacked on top of one another, they can also travel from body to body, and frame to frame within each body.

In one embodiment of the present invention, the frames are held in place via a plurality of interior ledges. In particular, the body may include an outer structure and at least two interior, recessed ledges, opposite one another. Each frame would then include a top frame having a plurality of tabs (or ears), where the first tab is configured to rest on the first interior ledge, and the second tab is configured to rest on the second interior ledge. By positioning the two interior ledges several inches from the top of the body, sufficient spacing can be ensured above the frames (i.e., between each frame and the top of the body). And by positioning the two interior ledges at a height above the bottom of the body, where the height is several inches longer than a height of each frame, sufficient spacing can also be ensured below the frames (i.e., between each frame and the bottom of the body).

A key element of the present invention is its ability to be modular, or stackable. Thus, a beehive may include a hive bottom, a hive top, and a plurality of hive bodies. To ensure modularity, not only should an uppermost portion of a body be configured to mate with a top, but it should also be configured to mate with a lowermost portion of a body. Similarly, not only should a lowermost portion of a body be configured to mate with a bottom, but it should also be configured to mate with an uppermost portion of a body. To this end, mating structures (e.g., a top and a body) should be "interlockable." The more interlocking the structures are, the more secure the beehive apparatus becomes. Especially if the structures are secured together (e.g., using screws, etc.).

In one embodiment of the present invention, "interlocking" is provided via a plurality of "steps," i.e., a first step in the body and a second step in the top, where the two steps are configured to mate with one another. In particular, an uppermost portion of the body includes an outer structure and an inner, recessed ledge, creating an L-shaped "step." This "step," which includes a first upward surface, a second upward surface, and an inward surface is configured to mate with a corresponding "step" in the top. The "step" in the top, which is constructed using structures that are also L-shaped, but upside down (to mate with the L-shaped structure in the body), includes a first downward surface, a second downward surface, and an outward surface. When the top is brought into contact with the body, the first downward surface will preferably rest on the first upward surface, the second downward surface will preferably rest on the second upward surface, and the outward surface is adjacent (and preferably in contact with) the inward surface. This "interlocking" feature, together with at least one securing means (e.g., screws fixing the two steps together, etc.), ensures that the beehive apparatus remains assembled even during harsh environmental conditions.

In preferred embodiments, the beehive apparatus should have an opening and at least one vent. Preferably, the vent should be located above the opening (e.g., to provide ventilation) and may include at least one structure (e.g., mesh, etc.) to prevent the vent from serving as an additional opening. The opening may be in the bottom, the body, or a space therebetween (i.e., where the two meet). Similarly, the vent may be in the top, the body, or a space therebetween.

Finally, because there are times when the interior of the body must be accessed (e.g., to check status, remove frames, etc.), an opening may be provided in a side of the body, allowing a beekeeper to gain access to an interior of the body without having to disassemble the beehive apparatus. This may involve a door with hinges, or a removable plate. In one embodiment, the frames are configured to be removed from (and inserted into) the body via the opening in the side of the body. This may involve, for example, channels that allow individual frames to be removed horizontally, instead of (or in addition to) vertically, as traditionally done.

A more complete understanding of a modular beehive apparatus will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 1A depicts a traditional bee's nest;

FIG. 1B depicts a traditional beehive having a hive body, a bottom board, and a cover;

FIG. 2 depict a beehive apparatus in accordance with one embodiment of the present invention, the beehive apparatus having a plurality of hive bodies;

FIGS. 5A and 5B depict exemplary method of affixing an inner foundation to an outer frame (i.e., frame-like assembly);

FIG. 6 depicts an inner foundation in accordance with one embodiment of the present invention;

FIG. 10 depicts an interior of a hive body in accordance with one embodiment of the present invention;

FIG. 11A depicts a beehive apparatus in accordance with one embodiment of the present invention, the beehive apparatus comprising a plurality of hive bodies;

FIG. 11B depicts a beehive apparatus in accordance with another embodiment of the present invention, the beehive apparatus comprising at least one hive body, a hive top, and a hive bottom;

DETAILED DESCRIPTION OF THE PREFERRED EMBODIMENT

Preferred embodiments of the present invention include a beehive apparatus that comprises a hive bottom, a hive top, a hive body, a plurality of frames, and a securing means for securing at least said body to said top. It should be appreciated that the term "beehive" is used herein in its broadest sense and includes all enclosures regardless of the overall shape or size, the number of components (e.g., the number of bodies, etc.), or its purpose. For example, the disclosed invention could be used to house other types of bees (e.g., for pollination, etc.), other insects, etc. It should also be appreciated that while a beehive apparatus (referred to herein as a "beehive") preferably includes a hive top, the "top" may be an actual top (such as a cover) or another hive body, as the hive bodies are disclosed herein as being modular, or stackable. Similarly, while the beehive preferably includes a hive bottom, the "bottom" may be an actual bottom (such as a bottom board) or another hive body. This modularity can be seen, for example, in FIG. 2, where three hive bodies (100a, 100b, 100c) are stacked on top of one another. The beehive 10 shown in FIG. 2 may further include an actual top (not shown) and an actual bottom (not shown).

Figure 3:
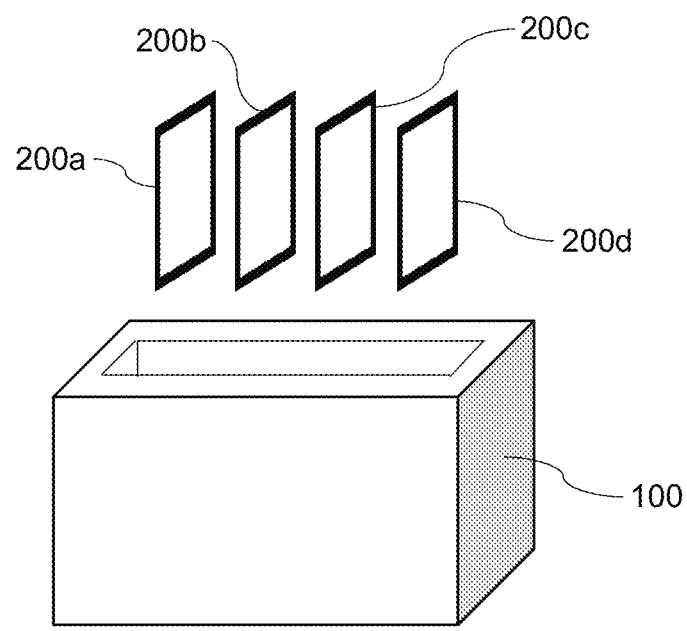
FIG. 3 depicts an exemplary hive body in accordance with one embodiment of the present invention, the hive body being configured to receive a plurality of frames.

As shown in FIG. 3, a hive body 100 may be configured to house a plurality of frames (200a, 200b, 200c, 200d). A frame is a structure that is used by a honey bee in constructing a honey comb. In particular, the honey bee will "draw out" (or attach) the honey comb to the frame. Thus, the frame should be configured to be removed from the body so that honey in the comb can be harvested. Similarly, a user should also be able to insert the frame back into the body. Those skilled in the art will appreciated that the frames should be secured inside the hive body with sufficient spacing (not only between the frames, but above and below) so that the bees can access both sides of the frame, and the individual frames do not get "glued" together. Different techniques for securing/spacing the frames are discussed in greater detail below.

Figure 4:
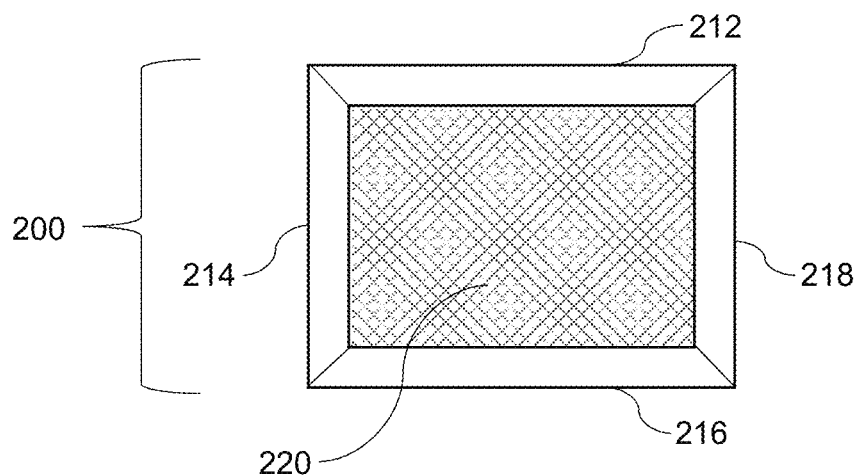
FIG. 4 depicts an exemplary frame in accordance with one embodiment of the present invention, the frame comprising an outer frame (i.e., frame-like structure) and an inner foundation.

An exemplary frame 200 is shown in FIG. 4, and includes a top frame 212, a bottom frame 216, a left frame 214, and a right frame 218. The components may be assembled as shown, i.e., secured together so that the left and right frames 214, 218 are parallel to one another, the top and bottom frames 212, 216 are parallel to one another, and the left and right frames 214, 218 are perpendicular to the top and bottom frames 212, 216. That being said, it should be appreciated that the present invention is not limited to the type of frame depicted in FIG. 4. For example, a frame that includes fewer or greater components (e.g., a single injection molded frame), is constructed using any materials that are generally known to those skilled in the art (e.g., wood, plastic, etc.), and/or is shaped differently (e.g., forming a trapezoid, etc.), is within the spirit and scope of the present invention.

With reference to FIG. 4, the frame may further include a foundation 220, which is a base structure (i.e., a "foundation") on which honey comb can be built. The foundation 220 may be made from a single material or a plurality of materials (i.e., an assembly) (see, e.g., FIG. 6 at 220, 230, 240), including metal (e.g., mesh, etc.), wax (e.g., beeswax, etc.), and/or plastic.

The foundation 220 (or assembly) can be affixed to the frame in several ways. For example, as shown in FIG. 5A, the foundation 220 (or assembly) may be affixed 222 to at least one surface (e.g., inner surfaces) of the top and bottom frames 212, 216. It may further (or alternatively) be affixed to at least one surface (e.g., inner surfaces) of the left and right frames (not shown). Alternatively, the foundation 220 (or assembly) may be embedded within the frame during construction. For example, the foundation 220 (or assembly) could be inserted into the frame during an injection molding process, or could be "sandwiched" between first and second portions of the frame during construction (e.g., between first and second portions of the top frame 212a, 212b, first and second portions of the bottom frame 216a, 216b, etc.). It should be appreciated that while different types of frames and foundations have been disclosed and discussed herein, the present invention is not limited to any particular type of frame or foundation. Thus, all frames and foundations generally known to those skilled in the art, including frames that do not include foundations, are within the sprit and scope of the present invention.

As discussed above, the frames should preferably be secured within the hive body with sufficient spacing (including spacing above, below, and between individual frames). This can be seen, for example, in FIG. 10, where the hive body 100 includes a plurality of frames 200a, 200b, 200c, a first opening 280 (an entrance for the bees), a second opening 290 (a vent for ventilation), and a stop 270 (limiting the size of the first opening 280 to one that can easily be protected by the bees). It should be appreciated that the hive body depicted in FIG. 10 is merely exemplary, and other hive bodies are within the spirit and scope of the present invention. For example, as discussed in greater detail below, the entrance and/or stop may be in the hive body, the hive bottom, or at a connection point therebetween (e.g., a gap between the body and the bottom may serve as an entrance, etc.). Similarly, the vent may be in the hive body, the hive top, or at a connection point therebetween (e.g., a gap between the body and the top may serve as a vent, etc.).

With reference back to FIG. 10, the frames 200a, 200b, 200c should be secured within the body so that the bees can access both sides of individual frames and travel from frame to frame. This may be accomplished by providing sufficient space between each frame (Streets 2 and 3), on the ends (between end frames and the sides of the body) (Streets 1 and 4), above (between each frame and a hive top) (Avenue A), and below (between each frame and a hive bottom) (Avenue B). By providing space above and below, not only can the bees travel from frame to frame, but if multiple bodies are stacked on top of one another, they can also travel from body to body, and frame to frame within each body.

Figure 7:
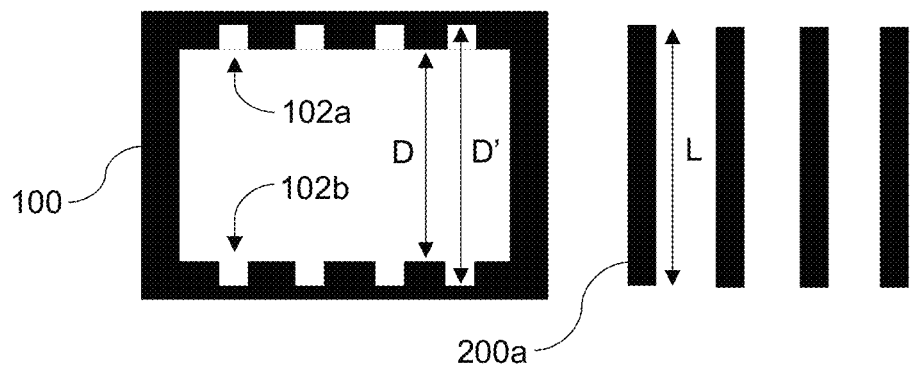
FIG. 7 depicts a support system for a plurality of frames in accordance with a first embodiment of the present invention.

FIG. 7 depicts a hive body for securing and spacing frames in accordance with one embodiment of the present invention. In this embodiment, the body 100 includes a plurality of opposing channels (or grooves) (e.g., 102a, 102b) configured to receive a plurality of frames (e.g., 200a). The channels may be configured to allow frames to be inserted into and removed from an opening in the top of the body (e.g., once the hive top is removed). Each frame should preferably have a length (L) that is shorter (at least slightly) than a distance (D') between opposing channels, and longer than a distance (D) between opposing interior (non-channel) surfaces. Such channels can be used to secure the frames within the body so that there is sufficient spacing between each frame. And, by providing a channel height that is several inches longer than a height of each frame, and several inches shorter than a height of the body (e.g., each channel terminates several inches before the bottom of the body), sufficient spacing can be provided both above and below the frames, allowing travel from frame to frame.

Figure 8:
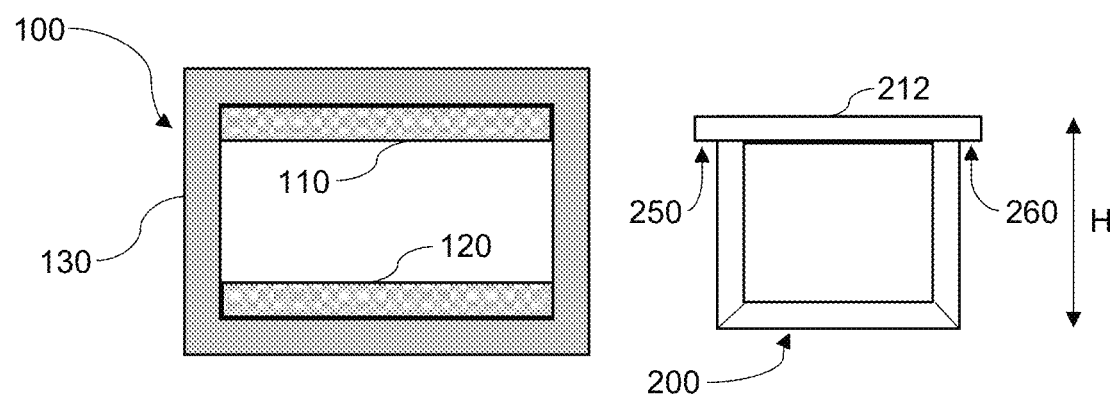
FIG. 8 depicts a support system for a plurality of frames in accordance with a second embodiment of the present invention.

FIG. 8 depicts a hive body for securing frames in accordance with another embodiment of the present invention. In this embodiment, the body 100 includes an outer structure 130 and at least two interior, recessed ledges 110, 120. Each frame 200 would then include a top frame 212 having a plurality of tabs (or ears) 250, 260, where the first tab 250 is configured to rest on the first interior ledge 110, and the second tab 260 is configured to rest on the second interior ledge 120. By positioning the two interior ledges 110, 120 several inches from the top of the body, sufficient spacing can be ensured above the frames (i.e., between each frame and the top of the body). And by positioning the two interior ledges 110, 120 at a height (not shown) above the bottom of the body, where the height is several inches longer than a height (H) of each frame, sufficient spacing can also be ensured below the frames (i.e., between each frame and the bottom of the body).

Figure 9:
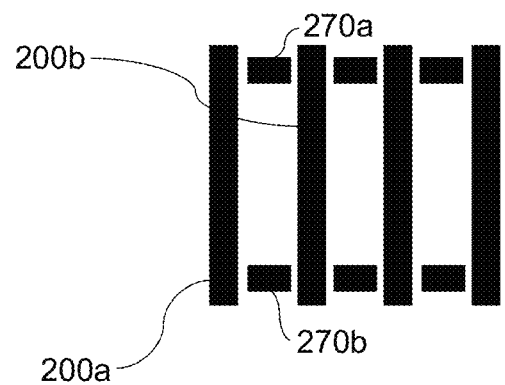
FIG. 9 depicts an embodiment where a plurality of spacers are used to maintain proper spacing between individual and adjacent frames.

To ensure sufficient spacing between each frame, the frames can either be manually spaced apart (horizontally on the ledges), or other features can be used to ensure sufficient horizontal spacing. For example, as shown in FIG. 9, spacers 270a, 270b can be used between adjacent frames (e.g., 200a, 200b). By way of another example, each ledge could have a plurality of sufficiently spaced apart indents (or recesses), where each indent has a width that is slightly larger than a thickness of each frame. By placing each frame (or tabs thereof) on the ledges, in corresponding indents, sufficient horizontal spacing can be provided.

Again, it should be appreciated that while different embodiments for securing and spacing frames have been disclosed and discussed herein, those embodiments are merely exemplary in nature, and other embodiments (e.g., embodiments that are not disclosed, but are known to those skilled in the art) are within the spirit and scope of the present invention.

A key element of the present invention is its ability to be modular, or stackable. Thus, a beehive may include (i) a plurality of hive bodies (see, e.g., FIG. 11A at 100a, 100b, 100c), (ii) a hive body, top and bottom (see, e.g., FIG. 11B at 100, 300, 400), or (iii) any combination thereof (e.g., a plurality of hive bodies, a top, and a bottom). With respect to this modularity, different embodiments will now be described. It should be appreciated, however, that while each beehive is discussed herein in terms of a body having a top and a bottom, other embodiments (e.g., a plurality of hive bodies with a top affixed to the uppermost body and a bottom affixed to the lowermost body) are within the sprit and scope of the present invention. In fact, in a preferred embodiment, the body's top is configured to mate with the body's bottom, which allows multiple (identical) bodies to be stacked on top of, and connected to, one another. Thus, an embodiment having (or being capable of having) multiple bodies is not only within the spirit and scope of the present invention, but preferred.

Figure 12A:
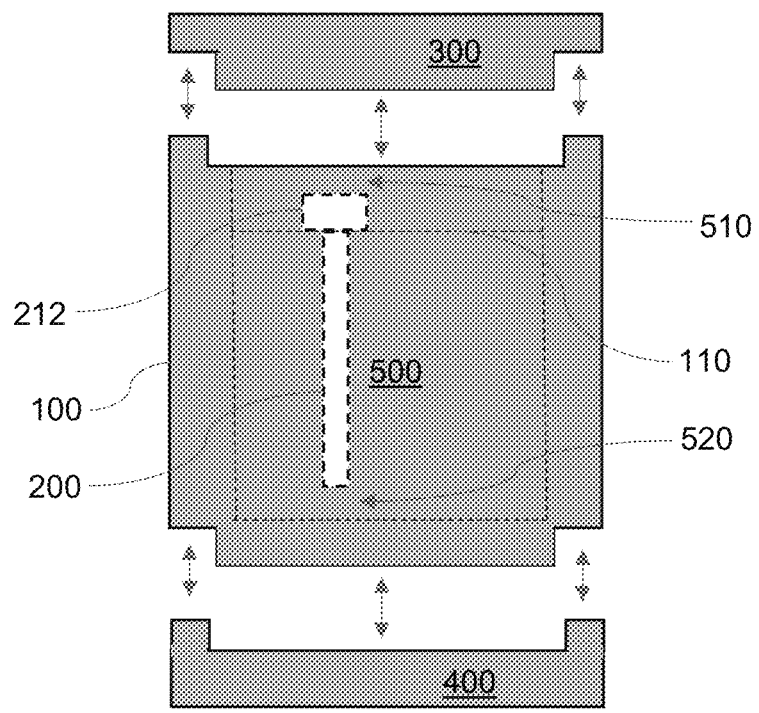
FIG. 12A illustrates details of the hive body, top, and bottom (depicted in FIG. 11B) in accordance with one embodiment of the present invention.

A first module beehive is illustrated in FIG. 12A. In this embodiment, the beehive includes a body 100 having an interior 500, a top 300, and a bottom 400, where the interior 500 of the body 100 is configured to support at least one frame 200 (e.g., by resting a top frame 212 (or tab portions thereof) on a plurality of ledges 110, 120). As previously discussed, the frame should have sufficient space (e.g., several inches) both above 510 and below 520, allowing the bees to travel from frame to frame.

Figure 12B:
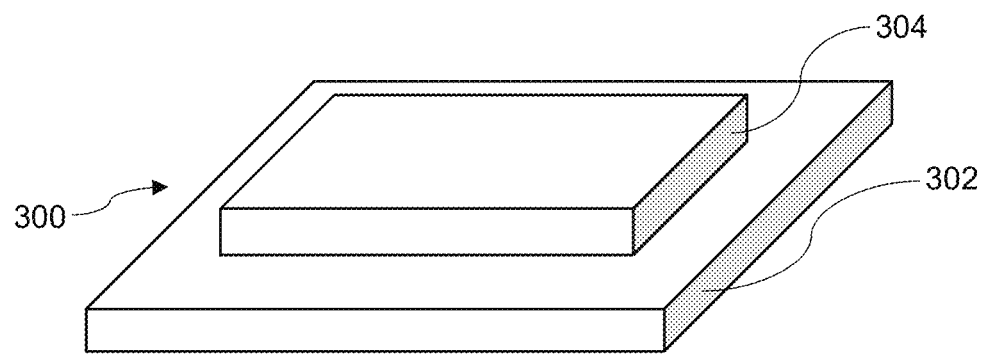
FIG. 12B illustrates details of the hive top (depicted in FIG. 12A) in accordance with one embodiment of the present invention.
Figure 13:
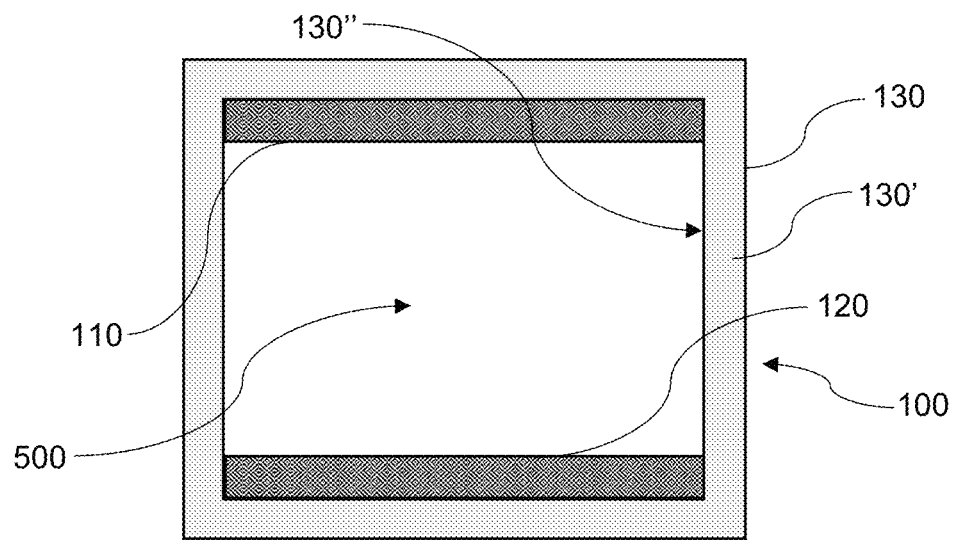
FIG. 13 illustrates details of the hive body (depicted in FIG. 12A) in accordance with one embodiment of the present invention.

As shown in FIG. 12A, the top 300 is configured to mate with a top (or uppermost) portion of the body 100. Similarly, the bottom 400 is configured to mate with a bottom (or lowermost) portion of the body 100. A perspective view of the top 300 is provided in FIG. 12B. In this embodiment, the top includes a first structure 302 and a second structure 304, where the second structure 304 extends from the first structure 302 and has a reduced perimeter. Both of these structures are configured to mate with the top (or uppermost) portion of the body 100 (see FIG. 12A). For example, as shown in FIG. 13, the first structure 302 (or a lower surface thereof) may be configured to rest on an upper surface 130' of the body's outer structure 130, thereby securing the top 300 vertically. In other words, it is the first structure 302 and the upper surface 130' that supports the top 300 vertically with respect to the body 100. The second structure 304 may have a perimeter (or shape) that is substantially the same as (e.g., slightly smaller than) an inner perimeter (or shape) defined by the body's outer structure, or an interior surface 130" thereof, thereby securing the top 300 horizontally. In other words, it is the snug fit between the second structure 304 and the outer structure's interior surface 130" that supports the top 300 horizontally with respect to the body 100.

Figure 14:
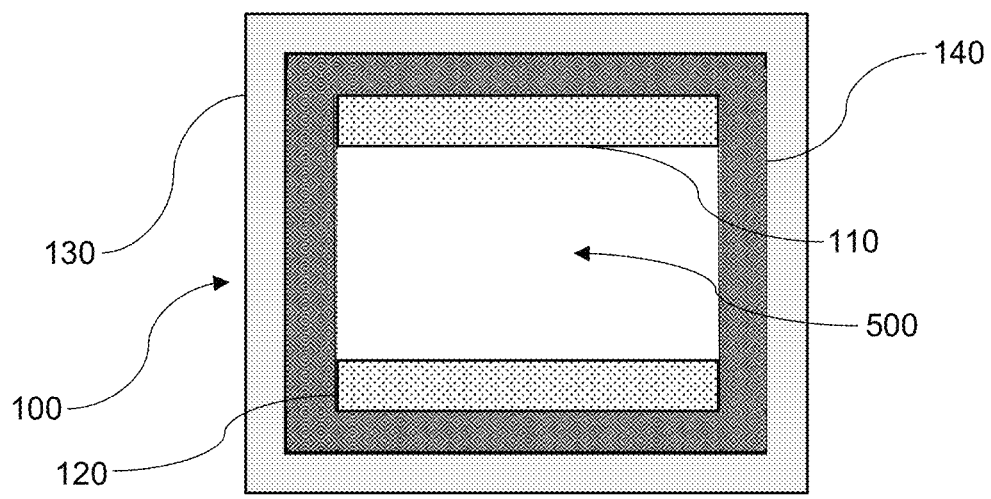
FIG. 14 illustrates details of the hive body (depicted in FIG. 12A) in accordance with another embodiment of the present invention.

FIG. 14 shows an alternate embodiment, where the body 100 further includes an inner, recessed ledge 140 for supporting the second structure 304 (i.e., the second structure 304 rests on the ledge 140). In this embodiment, the ledge 140 would reside (vertically) between the ledges 110, 120, and the upper surface of the outer body 130. By adding such a ledge 140, additional support (at least vertically) is provided.

Because the beehive is modular (i.e., additional bodies can be added), the bottom (or lowermost) portion of the body 100 resembles the top 300, and the bottom 400 resembles the top (or uppermost) portion of the body 100. Thus, the manner in which the bottom 400 mates with the body 100 is similar (but opposite) to that described above with respect to the top 300 and the body 100.

It should be appreciated that the present invention is not limited to the beehive (or portions thereof) depicted in FIGS. 12A, 12B, 13, and 14. In fact, other embodiment are discussed below, and are within the spirit and scope of the present invention. Notwithstanding the different embodiments, a key feature to all embodiments is the "interlocking" feature, or the manner in which the top and the body, or multiple bodies, mate together. The more interlocking the structures are, the more secure the beehive apparatus becomes. Especially if the structures are further secured together (e.g., using screws, latches, etc.).

Figure 15A:
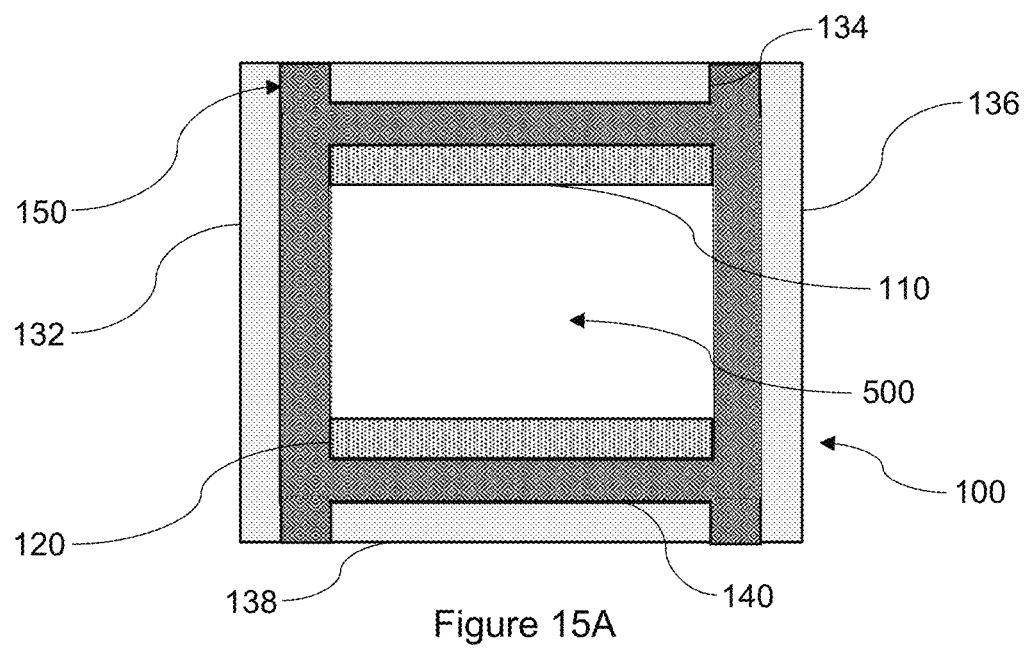
FIG. 15A illustrates details (a top perspective) of the hive body (depicted in FIG. 12A) in accordance with yet another embodiment of the present invention.
Figure 15B:
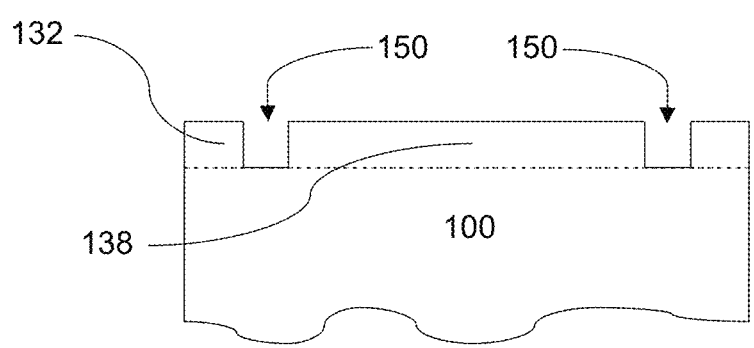
FIG. 15B provides a side perspective of the hive body illustrated in FIG. 15A.

For example, FIGS. 15A and 15B depict another embodiment of the present invention. In this embodiment, the uppermost portion of the body 100 includes an outer body that is segmented into a plurality of portions (e.g., 132, 134, 136, and 138). This is in contradistinction to the continuous outer body 130 depicted in FIG. 14. The uppermost portion of the body 100 further includes an inner, recessed ledge 140, similar to the one depicted in FIG. 14. However, in this embodiment, the ledge 140 extends between the outer body segments, creating notches 150 therebetween. Where the ledge 140 meets the outer body (e.g., segment 132), an L-shaped "step" is created, having a first upward surface (A), a second upward surface (B) and an inward surface (C) residing between the two (see, e.g., FIG. 15C).

Figure 15C:
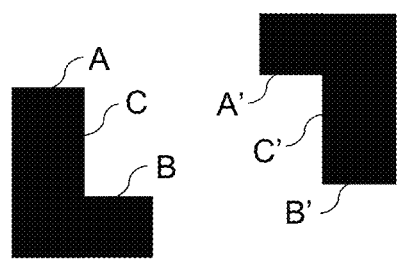
FIG. 15C illustrates how a plurality of "steps" can be used to mate (securely) a hive top, for example, to a hive body.
Figure 16A:
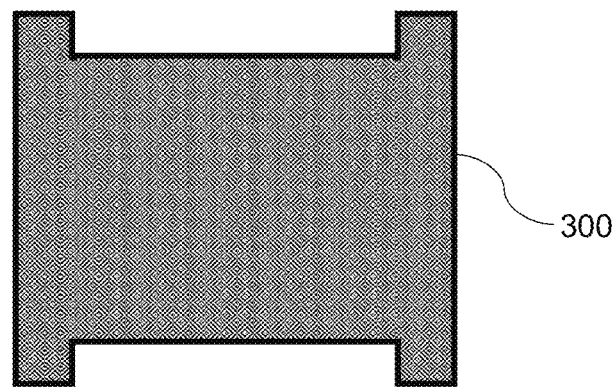
FIG. 16A illustrates details of the hive top (depicted in FIG. 12A) in accordance with one embodiment of the present invention.
Figure 16B:
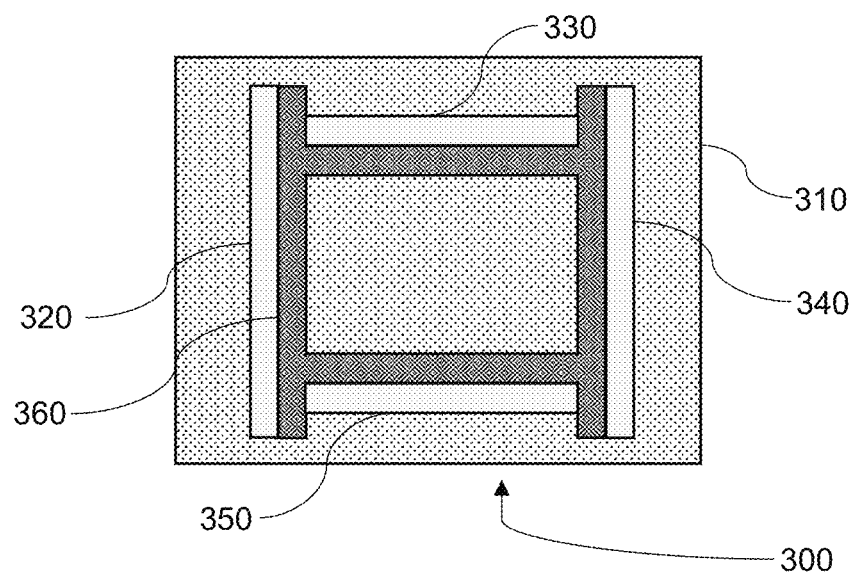
FIG. 16B illustrates details (a bottom perspective) of the hive top (depicted in FIG. 12A) in accordance with another embodiment of the present invention.
Figure 16C:
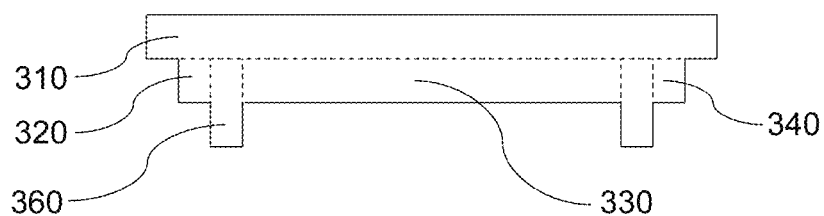
FIG. 16C provides a side perspective of the hive top illustrated in FIG. 16B.
Figure 17:
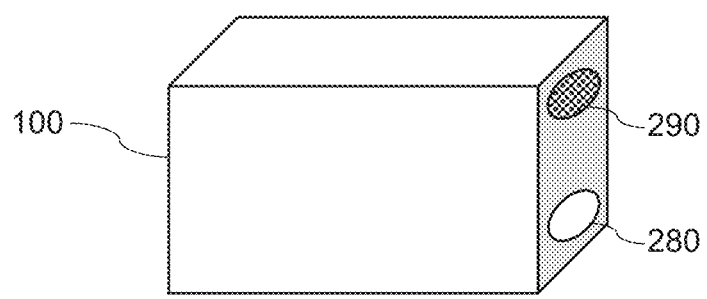
FIG. 17 depicts a hive body in accordance with one embodiment of the present invention, where the hive body includes both an entrance (or opening for the honey bees) and a vent.

This "step" is configured to mate with a corresponding "step" in the top 300 (see, e.g., FIGS. 16B, 16C; see also FIG. 15C at A' (first downward surface), B' (second downward surface), and C' (outward surface)). In other words, when the top 300 is brought into contact with the body 100, the first downward surface (A') comes to rest on the first upward surface (A), the second downward surface (B') comes to rest on the second upward surface (B), and the outward surface (C') is adjacent (and preferably in contact with) the inward surface (C). The "step" in the top 300 can perhaps best be seen in FIGS. 16B and 16C, where the top 300 includes a cover 310 (e.g., a substantially flat cover, etc.), a plurality of first structures (i.e., 320, 330, 340, 350) extending therefrom, and a second structure 360 extending further away from the cover 310. It is the "step" between the first structures (e.g., 320) and the second structure 360 (see, e.g., FIG. 16C) that mates with the "step" in the body 100, discussed above. The stability of the beehive apparatus (once assembled) is further enhanced by placing portions of the second structure 360 through the plurality of notches 150 (see FIG. 15B) in the body 100. It is this "interlocking" feature that enhances the overall integrity of the beehive assembly, making it less likely to come apart under abnormal conditions (e.g., bad weather, animal attacks, etc.).

It should be appreciated that the present invention is not limited to the embodiment depicted in the figures. A beehive assembly having other shapes, other features, made from different materials (e.g., wood, plastic, etc.), etc., is within the spirit and scope of the present invention. For example, a top 300 may merely mimic the shape of the recessed ledge 140 (e.g., without a "step") (see FIG. 16A). Other design choices (e.g., a flat cover vs. a pitched roof, weatherproofing, etc.) are also within the spirit and scope of the present invention.

Figure 18:
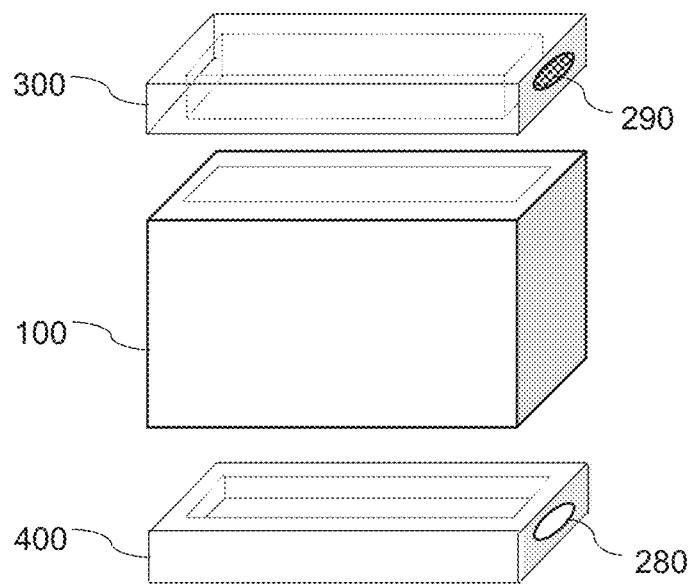
FIG. 18 depicts a hive apparatus in accordance with one embodiment of the present invention, where the hive bottom includes an entrance (or opening for the honey bees) and the hive top includes a vent.

As discussed above, the beehive apparatus should have an opening and at least one vent. Preferably, the vent should be located above the opening (e.g., to provide ventilation) and may include at least one structure (e.g., mesh, etc.) to prevent the vent from serving as an additional opening. As shown in FIG. 18A, the opening 280 and the vent 290 may be in the body 100. As shown in FIG. 18B, the opening 280 may be in the bottom 400 and the vent may be in the top 300. Obviously, any combination thereof (e.g., an opening in the bottom 400 and a vent in the body 100, etc.) is within the spirit and scope of the present invention. An opening (or vent) that is create by a gap where two structures mate is also within the spirit and scope of the present invention.

Figure 19:
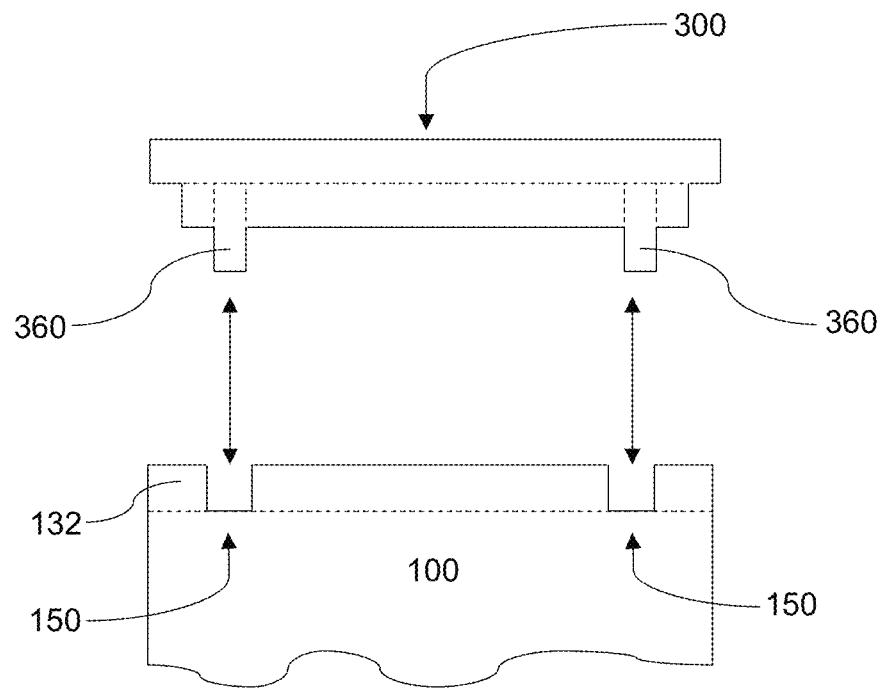
FIG. 19 depicts one embodiment of mating the hive top to the hive base.
Figure 20:
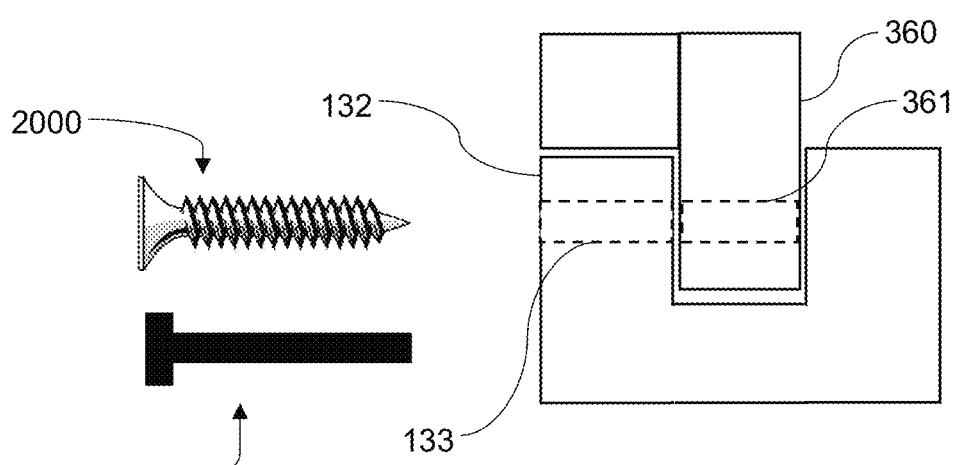
FIG. 20 depict several embodiments of securing (or affixing) the hive top to the hive base.
Figure 21:
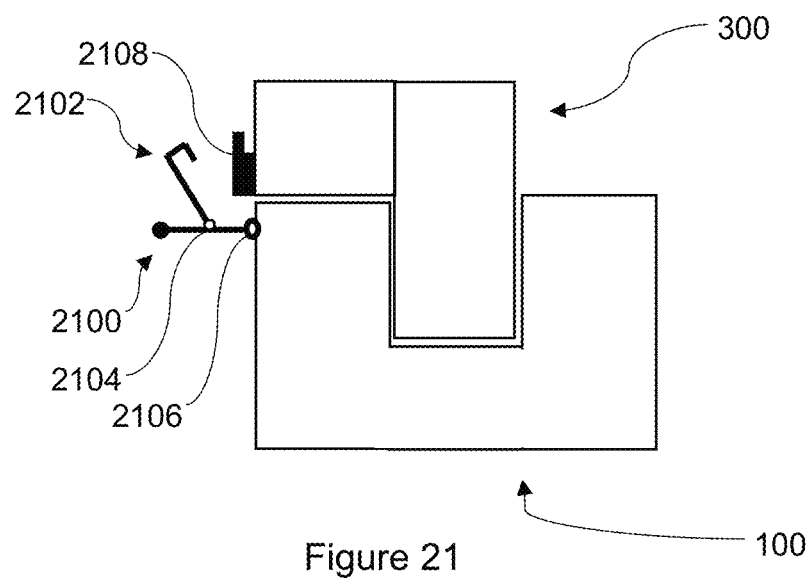
FIG. 21 depicts another embodiment of securing (or affixing) the hive top to the hive base.

To enhance the structural integrity of the beehive, at least one securing means may be used to connect (preferably removably) the structures together. For example, FIG. 19 shows a top 300 configured to make with a body 100 via a plurality of "steps," as previous discussed. Once the two are mated, as shown in FIG. 20, a securing means, such as a screw 2000 or a pin 2002 may be inserted into the "steps" (in both the body 100 and the top 300) to secure the top to the body together. It should be appreciated that other securing means are within the spirit and scope of the present invention. For example, a plurality screws and/or pins may be used, pre-drilled holes may be provided in the top and/or body, a separate (or different) securing means may be used to secure the body 100 to the bottom 400 or the body 100 to another body (e.g., 100b), and other (different) securing methods may be used. For example, as shown in FIG. 21, at least one latch 2100 (e.g., draw latch) may be used to secure the top 300 to the body 100. The latch 2100 may include, for example, an arm 2104 on a pivot 2106, a clasp 2102 attached to the arm 2014 (e.g., midway), and a closure 2108. Obviously, other types of latches are within the spirit and scope of the present invention.

Figure 22:
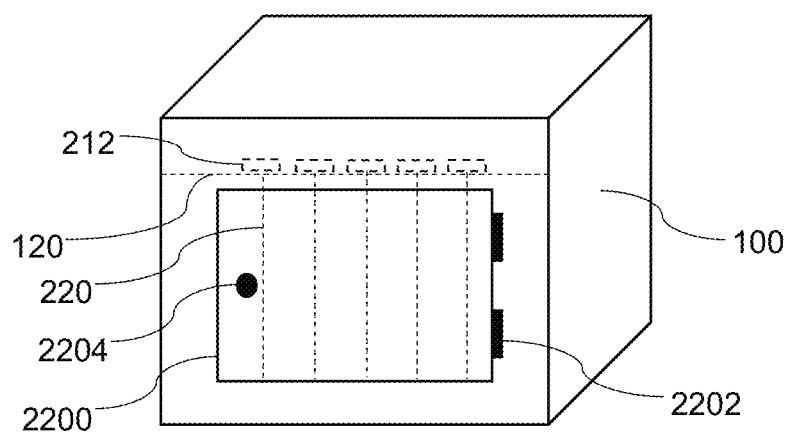
FIG. 22 depicts a hive body in accordance with an alternate embodiment of the present invention, where the hive body includes a removable opening for gaining access to an interior portion of the hive body without having to remove the hive body from the bottom, top, or second hive body.

During use, it may be necessary for the beekeeper to check status (e.g., honey production, etc.) of the hive. Traditionally, this would require removing the cover and pulling out individual frames. However, in a modular system, such as the one disclosed, drilling down to an individual body, which may require removing the top and any intermediary bodies, is not only disruptive to the colony, but may require certain tools, a fair amount of time, etc. Thus, in one embodiment, as shown in FIG. 22, an opening 2200 is provided so that the beekeeper can check status. Another opening (not shown) could be provide on the opposite side of the body, which would allow more light into the box, provide further access, etc. If the opening 2200 is a door, the body 100 may further include a plurality of hinges 2202 and a handle 2204. Other openings, however, such as a plate held in place by a plurality of screws, are within the spirit and scope of the present invention.

Figures 23A, 23B:
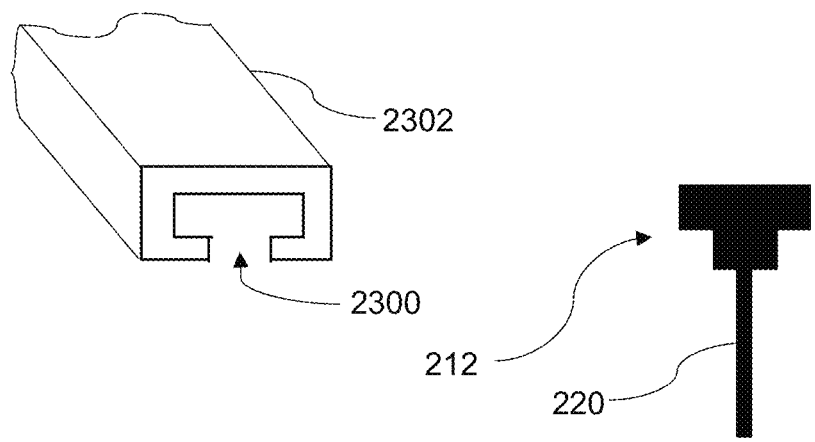
FIGS. 23A, 23B, and 24 illustrate a channel/frame assembly that would allow a frame to be removed from a side of the hive body (see, e.g., FIG. 22) as opposed (or in addition) to the top (see, e.g., FIG. 3)
Figure 24:
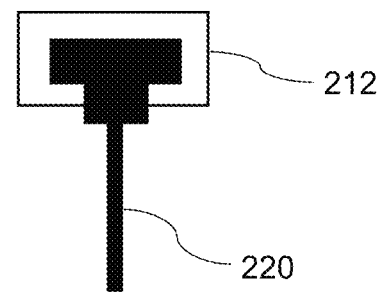
Figure 25A:
FIGS. 25A and B illustrate an alternate channel that would allow a frame to be removed from a side of the hive body (see, e.g., FIG. 22) as opposed (or in addition) to the top (see, e.g., FIG. 3).
Figure 25B:
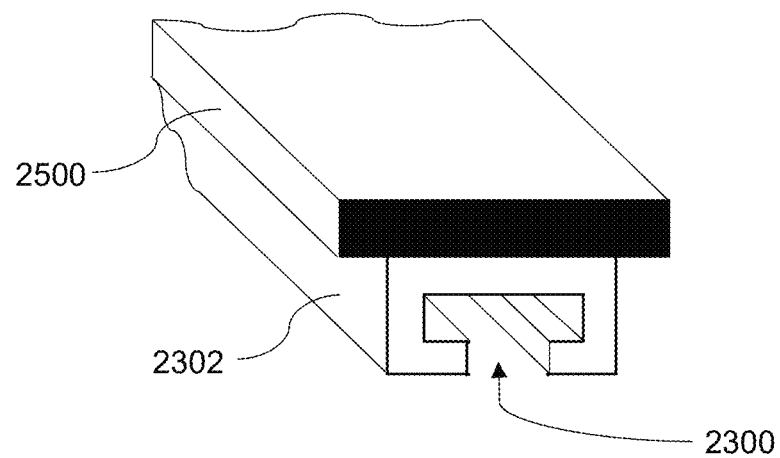

If the frames are resting on a ledge (e.g., via a tab), then the opening should preferably be below the ledge, to not interfere with the frames' support structure. If the opening is large enough (larger, at least diagonally, than a height of the frame), and there is enough space between frames, the frame may be able to be rotated (so the tab clears the ledge), lowered, and removed via the opening. Alternatively, the frame, itself (or a separate frame support structure) may be configured so that the frame can be inserted into and removed via an opening in the side of the body without having to rotate, lower, etc. For example, as shown in FIGS. 23A and 23B, a structure 2302 may be added to the body having a channel 2300 that matches (in shape) a top frame 212, which may or may not include a foundation 220. The frame could then be inserted into the body via an opening by sliding the top frame 212 into the channel 2300 (see FIG. 24). An alternate embodiment is shown in FIGS. 25A and 25B, where the structure 2302 that includes the channel 2300 is further attached to a structure 2500 having tabs 2502. Like the frame tabs 250, 260 and ledges 110, 120 shown in FIG. 8, the structure 2500 could be inserted from the top (during assembly), with the tabs 2502 resting on the ledges 110, 120. Individual frames could then be removed from (or inserted) into the body via an opening in the side of the body by sliding of the top frame 212 out of (or into) the channel 2300 in the structure 2302. As with other embodiments, the features depicted in FIGS. 23-25 are merely exemplary, and are not necessarily limitations of the present invention.

Having thus described several embodiments of a modular beehive apparatus, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. A modular beehive apparatus for containing and raising honey bees, comprising:
   a hive body comprising a plurality of sides defining a hollow interior, each one of said plurality of sides having a upper end, a lower end, and a first step located at said upper end, said first step comprising a first upward surface, a second upward surface, and an inward surface residing between said first and second upward surfaces;
   a plurality of frames configured for placement within said hollow interior of said hive body, said plurality of frames being used by said honey bees to build honey combs;
   a hive bottom comprising at least a horizontal structure configured for attachment to a lower end of said hive body;
   a hive top comprising a structure and a plurality of sides extending downward therefrom, each one of said plurality of sides having a second step located opposite said structure and having a first downward surface, a second downward surface, and an outward surface residing between said first and second downward surfaces; and
   a plurality of securing means for removably connecting said hive top to said hive body;
   wherein said first and second steps are configured to mate said hive top with said hive body, said hive top being configured to mate with said hive body by resting said first downward surfaces on said first upward surfaces, resting said second downward surfaces on said second upward surfaces, and placing said outward surfaces inside and adjacent said inward surfaces;
   wherein said upper end of said hive body comprises first and second ones of said plurality of sides perpendicular to third and fourth ones of said plurality of sides, each of said first and second ones of said plurality of sides having a length that is greater than a distance between said third and fourth ones of said plurality of sides, and each of said third and fourth ones of said plurality of sides having a length that is shorter than a distance between said first and second ones of said plurality of sides, thereby creating a plurality of notches between said first and second ones of said plurality of sides and said third and fourth ones of said plurality of sides;
   wherein a lower surface of said hive top comprises first and second ones of said plurality of sides perpendicular to third and fourth ones of said plurality of sides, each of said first and second ones of said plurality of sides having a length that is greater than a distance between said third and fourth ones of said plurality of sides, thereby creating a plurality of tabs, each one of said plurality of tabs being configured for placement into a corresponding one of said plurality of notches; and
   wherein said first and second ones of said plurality of sides of said hive top are configured for placement inside and adjacent said first and second ones of said plurality of sides of said hive body, and said third and fourth ones of said plurality of sides of said hive top are configured for placement inside and adjacent said third and fourth ones of said plurality of sides of said hive body.

2. The modular beehive apparatus of claim 1, wherein said third one of said plurality of sides of said hive body comprises a first portion, a second portion, and a gap therebetween, said gap allowing a user to visualize that said first and second steps are mated together prior to securing said hive top to said hive body.

3. The modular beehive apparatus of claim 1, wherein said fourth one of said plurality of sides of said hive body comprises a first portion, a second portion, and a gap therebetween, said gap allowing a user to visualize that said first and second steps are mated together prior to securing said hive top to said hive body.

4. The modular beehive apparatus of claim 1, wherein said hive body further comprises third and fourth upward surfaces configured to support said plurality of frames within said hollow interior of said hive body, each one of said plurality of frames comprises (i) a plurality of tabs configured to rest on said third and fourth upward surfaces and (ii) having a height that is less than said hollow interior of said hive body, thereby proving a first horizontal spacing above said plurality of frames within said hive body and a second horizontal spacing below said plurality of frames within said hive body, said first and second horizontal spacings allowing said honey bees to travel from one of said plurality of frames to another one of said plurality of frames.

5. The modular beehive apparatus of claim 4, further comprising a plurality of spacers for spacing out said plurality of frames within said hollow interior of said hive body, wherein said plurality of spacers allow said honey bees to travel vertically within said hollow interior of said hive body.

6. The modular beehive apparatus of claim 4, wherein said first horizontal spacing is located between said plurality of frames and said hive top.

7. The modular beehive apparatus of claim 6, wherein said second horizontal spacing is located between said plurality of frames and said hive bottom.

8. The modular beehive apparatus of claim 1, wherein said hive top comprises a second hive body, said second steps being located at a bottom of said second hive body, thereby allowing said bottom of said second hive body to mate with a top of said hive body.

9. The modular beehive apparatus of claim 1, further comprising an opening between said hive bottom and said hive body, said opening allowing said honey bees to enter and exit said apparatus once assembled.

10. The modular beehive apparatus of claim 1, wherein said hive body further comprises at least one vent, said at least one vent and an opening allowing air to flow through and ventilate said hollow interior of said hive body.

11. The modular beehive apparatus of claim 1, wherein said hive body further comprises a first set of interior grooves opposite a second set of interior grooves, a first one of said first set of interior grooves and a first one of said second set of interior grooves being configured to support a first one of said plurality of frames with said hollow interior of said hive body.

12. The modular beehive apparatus of claim 1, wherein each one of said plurality of frames includes a foundation for said honey bees to build said honey combs.

13. The modular beehive apparatus of claim 1, wherein said securing means comprises a plurality of screws for affixing a portion of said second steps in said hive top to a portion of said first steps in said hive body.

14. The modular beehive apparatus of claim 1, wherein a first one of said plurality of sides of said hive body comprises a vertical portion that is one of openable and removable, thereby allowing a user to view at least a portion of said hollow interior of said hive body without taking off said hive top.

15. The modular beehive apparatus of claim 14, wherein each one of said plurality of frames can be removed from and inserted into said hollow interior via said vertical portion once said vertical portion is one of opened and removed.

16. The modular apparatus of claim 15, wherein each one of said plurality of frames can further be inserted into and removed from said hollow interior via an upper opening in said hive body that is accessible to a user when said hive top is one of not connected to and removed from said hive body.

17. A method for constructing a modular beehive, comprising:
- affixing a hive body to a hive bottom, said hive body comprising a plurality of sides defining an interior, each one of said plurality of sides having an upper end, a lower end, and a first step located at said upper end, said first step comprising a first upward surface, a second upward surface, and an inward surface residing between said first and second upward surfaces;
- inserting a plurality of frames into said interior of said hive body, said plurality of frames configured for use by honey bees to build honey combs; and
- affixing a hive top to said hive body, said hive top comprising a structure and a plurality of sides extending downward therefrom, each one of said plurality of sides having a second step located opposite said structure and having a first downward surface, a second downward surface, and an outward surface residing between said first and second downward surfaces;
- wherein said step of affixing said hive top to said hive body comprises (i) mating said first steps with said second steps, said mating step comprising resting said first downward surfaces on said first upward surfaces and resting said second downward surfaces on said second upward surfaces so that said outward surfaces are inside and adjacent said inward surfaces, and (ii) securing said hive top to said hive body;
- wherein said hive body comprises first and second ones of said plurality of sides perpendicular to third and fourth ones of said plurality of sides, each of said first and second ones of said plurality of sides having a length that is greater than a distance between said third and fourth ones of said plurality of sides, and each of said third and fourth ones of said plurality of sides having a length that is shorter than a distance between said first and second ones of said plurality of sides, thereby creating a plurality of notches between said first and second ones of said plurality of sides and said third and fourth ones of said plurality of sides;
- wherein said hive top comprises first and second ones of said plurality of sides perpendicular to third and fourth ones of said plurality of sides, each of said first and second ones of said plurality of sides having a length that is greater than a distance between said third and fourth ones of said plurality of sides, thereby creating a plurality of tabs, each one of said plurality of tabs being configured for placement into a corresponding one of said plurality of notches; and
- wherein mating said hive top to said hive body comprises placing said first and second ones of said plurality of sides of said hive top inside and adjacent said first and second ones of said plurality of sides of said hive body, respectively, and placing said third and fourth ones of said plurality of sides of said hive top inside and adjacent said third and fourth ones of said plurality of sides of said hive body, respectively.

18. The method of claim 17, wherein said third one of said plurality of sides of said hive body comprises a first portion, a second portion, and a gap therebetween, said gap allowing a user to visualize that said first and second steps are mated together prior to securing said hive top to said hive body.

19. The method of claim 18, wherein said fourth one of said plurality of sides of said hive body comprises a first portion, a second portion, and a gap therebetween, said gap allowing a user to visualize that said first and second steps are mated together prior to securing said hive top to said hive body.

20. The method of claim 19, wherein said step of securing said hive top to said hive body comprises using a plurality of screws to secure said first, second, third, and fourth ones of said plurality of sides of said hive top to said first, second, third, and fourth ones of said plurality of sides of said hive body, respectively.

* * * * *